United States Patent
Norbeck, Jr. et al.

(10) Patent No.: US 9,552,226 B1
(45) Date of Patent: Jan. 24, 2017

(54) PREDICTIVE ORDER STATUS SYSTEM AND METHOD FOR COMPUTING ENVIRONMENT

(71) Applicant: VCE Company, LLC, Richardson, TX (US)

(72) Inventors: Donald Norbeck, Jr., Lafayette Hill, PA (US); Jeffery Hayward, Lucas, TX (US); Thaddeus Stoner, Clearwater, FL (US); James A. Ellers, Portland, OR (US); Ryan J. Andersen, Belmont, MA (US); John J. Mulqueeney, Jr., San Bruno, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 0 days.

(21) Appl. No.: 14/587,924

(22) Filed: Dec. 31, 2014

(51) Int. Cl.
- *G06F 9/45* (2006.01)
- *G06F 9/48* (2006.01)
- *G06F 9/54* (2006.01)

(52) U.S. Cl.
CPC .............. *G06F 9/4887* (2013.01); *G06F 9/54* (2013.01)

(58) Field of Classification Search
CPC ..... G06F 9/4881; G06F 9/4843; G06F 9/3851
USPC ....................................................... 718/107
See application file for complete search history.

(56) References Cited

U.S. PATENT DOCUMENTS

| | | | | |
|---|---|---|---|---|
| 2005/0209901 | A1* | 9/2005 | Miller | G06Q 10/06311 705/7.15 |
| 2008/0262887 | A1* | 10/2008 | Guthrie | G06Q 10/04 705/7.27 |
| 2011/0071869 | A1* | 3/2011 | O'Brien | G06Q 10/06 705/7.12 |

* cited by examiner

*Primary Examiner* — John Chavis
(74) *Attorney, Agent, or Firm* — Polsinelli PC

(57) ABSTRACT

A predictive order status system includes one or more processors to receive a request for a current order status of an order for a computing environment, the order having at least one task representing a segment of an order process for completing the order and the request associated with a unique order identifier, determine the current order status for the order for the computing environment, the current order status comprising a simulated percentage value that is based on an amount of elapsed time since the order was placed divided by a total order process time to complete the order, determine an exception status for the order for the computing environment, the exception status being one of on track to be completed within the total order process time to complete the order, possibly at risk for being completed within the total order process time to complete the order, and at risk for being completed within the total order process time, and send a graphical user interface representation of the current order status and the exception status.

20 Claims, 8 Drawing Sheets

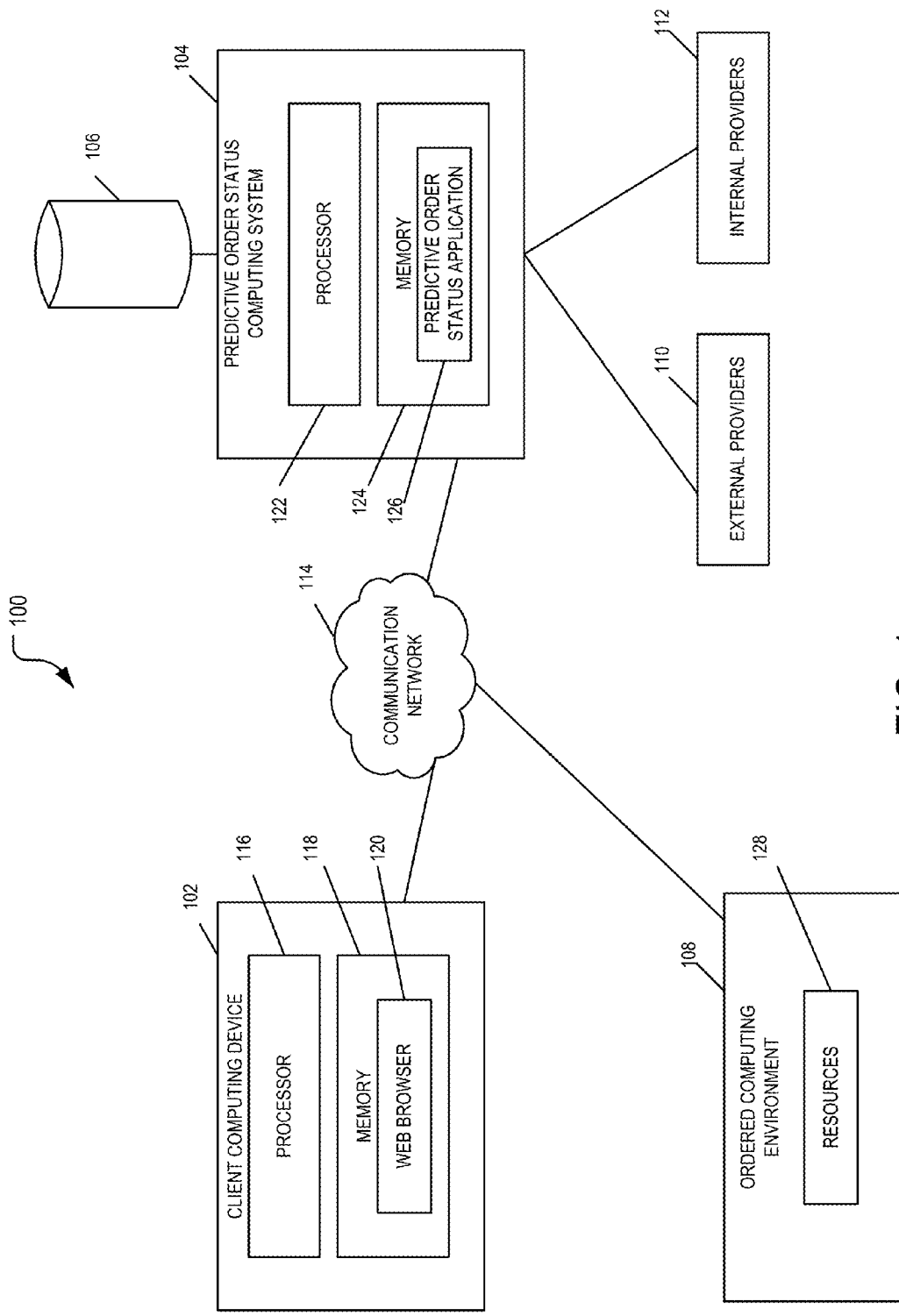

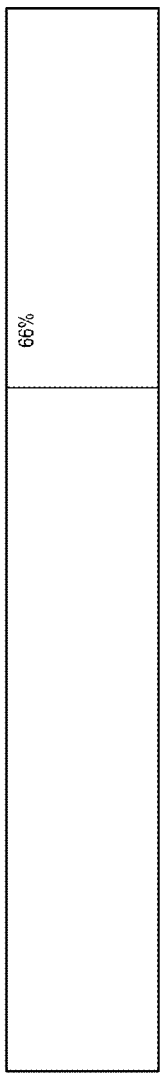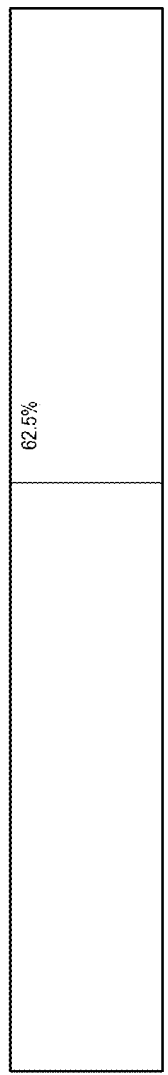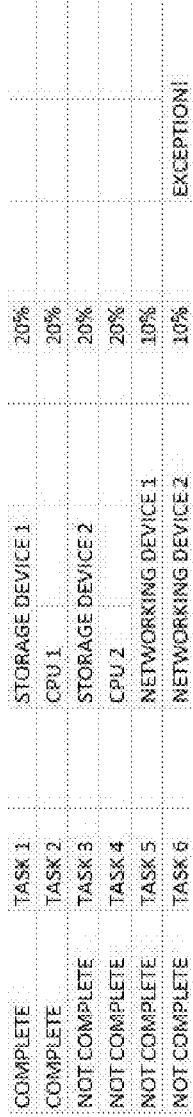

PREDICTIVE ORDER STATUS SYSTEM AND METHOD FOR COMPUTING ENVIRONMENT

TECHNICAL FIELD

Aspects of the present disclosure relate to computing devices and, in particular, to a predictive order status system and method for a computing environment.

BACKGROUND

Computing resources used by enterprises, such as corporations and universities, are often provided by one or more cloud computing providers and hardware providers that offer hardware resources and software resources that function in a collaborative manner to meet the computing resource needs of the enterprise. The computing resources may be provided by one or more providers and may be used to power one or more workloads, web sites, and/or software applications used by the enterprise. While being provisioned and built, information technology (IT) representatives associated with the enterprises have been unable to obtain an accurate, meaningful, and comprehensive status of provisioning and the delivery of the computing resources. Consequently, the enterprises may be uninformed or misinformed. On the other hand, too much status information could be overwhelming and difficult to understand.

SUMMARY

According to one aspect of the present disclosure, a predictive order status system includes an application for monitoring a list of representative task items for the computing system as a whole and a list of representative task items for each of a plurality of resources associated with the computing system. According to one embodiment, the system includes one or more processors to receive a request for a current order status of an order for a computing environment, the order having at least one task representing a segment of an order process for completing the order and the request associated with a unique order identifier, determine the current order status for the order for the computing environment, the current order status comprising a simulated percentage value that is based on an amount of elapsed time since the order was placed divided by a total order process time to complete the order, determine an exception status for the order for the computing environment, the exception status being one of on track to be completed within the total order process time to complete the order, possibly at risk for being completed within the total order process time to complete the order, and at risk for being completed within the total order process time, and send a graphical user interface representation of the current order status and the exception status.

According to another embodiment, a method includes receiving, by at least one processor, a request for a current order status of an order for a computing environment, the order having at least one task representing a segment of an order process for completing the order and the request associated with a unique order identifier, determining, by the at least one processor, the current order status for the order for the computing environment, the current order status comprising a simulated percentage value that is based on an amount of elapsed time since the order was placed divided by a total order process time to complete the order, determining, by the at least one processor, an exception status for the order for the computing environment, the exception status being one of on track to be completed within the total order process time to complete the order, possibly at risk for being completed within the total order process time to complete the order, and at risk for being completed within the total order process time, and sending, by the at least one processor, a graphical user interface representation of the current order status and the exception status.

According to a further embodiment, a non-transitory computer-readable medium includes instructions stored thereon that, when executed by at least one processor, cause the at least one processor to perform operations including receiving a request for a current order status of an order for a computing environment, the order having at least one task representing a segment of an order process for completing the order and the request associated with a unique order identifier, determining the current order status for the order for the computing environment, the current order status comprising a simulated percentage value that is based on an amount of elapsed time since the order was placed divided by a total order process time to complete the order, determining an exception status for the order for the computing environment, the exception status being one of on track to be completed within the total order process time to complete the order, possibly at risk for being completed within the total order process time to complete the order, and at risk for being completed within the total order process time, and sending a graphical user interface representation of the current order status and the exception status.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

FIG. 1 illustrates an example predictive order status system according to one embodiment of the present disclosure.

FIGS. 5C and 5D illustrate an example current order status for an ordered computing environment account to one embodiment of the present disclosure.

DETAILED DESCRIPTION

Figure 2A:
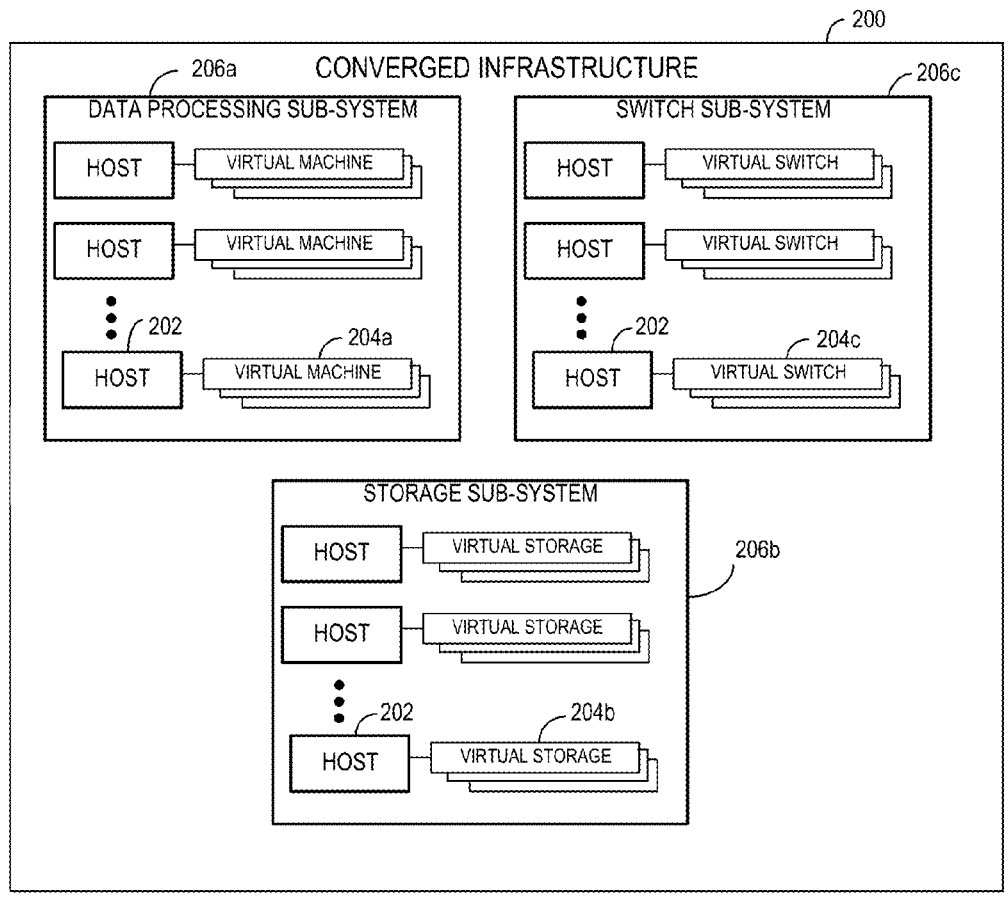
FIGS. 2A and 2B illustrate an example converged infrastructure that may be in communication with the predictive order status system according to one embodiment of the present disclosure.

Embodiments of the present disclosure provide a system for providing a predictive order status by monitoring a list of representative task items for each of a plurality of resources associated with a computing system. As an example, each of the plurality of resources may be a component of the computing system, e.g., a server, a networking device, a storage device, a software application, and others. Each of these components may have a number of steps comprising task items to complete an order for the computing system. As an example, component one, e.g., a storage array, includes task items 1—verify storage space is available, 2—reserve storage space, and 3—logically assign storage space. Each task item 1, 2, and 3 may include sub-tasks or sub-steps including A, B, and C. The computing system may further include task items 4-6 associated with a second component, e.g., a networking component, and task items 7-9 associated with a third component, e.g., a server computing device. Embodiments may include determining an order status based on a current status of each item on the list of representative task items and providing tactile and/or asynchronous feedback regarding the current status and possible exceptions. Conventionally, consumers manually requested order status and may not readily have access to a predictive order status, but embodiments of the present disclosure provide a system that provides a predictive or simulated order status for an ordered computing environment that is in the process of being provisioned, built, and delivered.

According to an example embodiment, the system may include a web server that utilizes a web application framework to support a dynamic website and/or a web application. The web server deploys and runs JavaServer Pages (JSP), Active Server Pages (ASP), ASP.NET pages, PHP pages, and/or other types of pages that include server-side and/or client-side scripts that interact with a user using a client computing device. According to example embodiments, the web server receives requests and dynamically generates web pages for providing the predictive order status. A client computing device transmits a request to the web server that identifies one or more computing resource orders. Next, the web server determines the order status based on the current status of each item on the list and transmits a response comprising the dynamically generated web pages for providing the predictive order status. As a result, a user of the client computing device may view the current order status and provide input regarding the possible exceptions including making modifications to the order to eliminate the exceptions.

An enterprise, such as a corporation, a professional organization, a government agency, a university, or a data center operator, may order any number of computing resources to fulfill some computing need such as running one or more software applications, hosting one or more websites, providing a network connection, and storing data. The order may be placed by an administrator, e.g., a central information technology (IT) user. The central IT user may have the responsibility of enabling computing resources for consumption by business users, e.g., end consumers, employees of a company, students and faculty of a university, and application developers of the enterprise. The application developers may manage software applications for the enterprise. As an example, the central IT user may be responsible for supplying an email system and other productivity applications for a corporation of five hundred employees. The central IT user may have the ability to create, review, add, change, and delete objects, policies, and service offerings used to power the email system and the other productivity applications provided by the computing system. In the present example system, computing resources that are ordered are referred to as objects and managed in the system as objects.

The order may be for one or more objects comprising an atomic computing device, a converged computing device, and/or an abstracted computing device. As an example, an object may be a blade server, a storage array, a firewall, and/or a software application, among other objects. An object also may be an abstraction of a group of objects, e.g., a storage pool comprising a plurality of storage devices. An object model may include a description of interrelationships between objects. The object model may be used to define relationships between objects for a particular computing environment or computing resource, e.g., a computing environment includes object A, object B, and object C. Object A comprises objects D, E, and F. Object B comprises objects G, H, and I. As an example, Object C may not be built until object A is completed. Object C comprises objects J, K, and L.

The object model is used to standardize mapping of objects to component configurations. As an example, the object model may be provided by or based on Topology and Orchestration Specification for Cloud Applications (TOSCA). TOSCA enables interoperable description of application and infrastructure cloud services, enables the relationships between the parts of the services, and enables the operational behavior of the services including deploy, patch, and shutdown. The description is designed to be independent of any supplier providing the objects or services. In other words, the object model describes any number of possible computing resources as unique objects in a standardized way. The computing system may be described in a standardized way using the object model comprising any number of objects representative of the various resources forming the computing system.

The policies may be used to apply constraints to the computing system. The policies may be created or defined by the administrator or central IT user. As an example, there may be location based policies, availability based policies, compliance based policies, performance based policies, and other types of policies. There may be policies related to physically locating the hardware in a particular location in the world, e.g., US East, US West, EU, Asia Pacific, and South America. There may be policies related to availability of the computing system, e.g., 99.999% or five nines, 99.99% or four nines, 99.9% or three nines, and 99% or two nines. There may be policies related to specific types of compliance, e.g., PCI (Payment Card Industry Data Security Standard), PII (Personally identifiable information), HIPAA (Health Insurance Portability and Accountability Act). There may be policies related to performance of the computing system including high performance, mid-range performance, and economy performance. In addition, there may be other policies related to computing systems having specific features or components such as flash based storage or network virtualization software such as VMWare NSX™.

In many instances, the order takes a significant amount of time to fulfill or complete. Generally, according to an example embodiment, an order process may take forty-five to sixty days to complete from start to finish in a relatively fast and efficient setting, and often takes much longer. In the past, an order process may have taken six months, a year, eighteen months, or even longer to complete. Conventionally, the central IT user or an application developer requested a status of the order by interacting with representatives via email or telephone. Very often, no status information is available or minimal status information may be available. Representatives tasked with building the order may simply indicate that the order is in progress and be unable to provide any additional information. This leaves the central IT user and the corresponding employees uninformed or misinformed. Because time is money, this is not an adequate solution. The central IT user and employees may incorrectly believe that because there is not a status of the order that the order is not being worked on.

According to an exemplary embodiment, each order may have a specific list of task items that are completed during the order process. Based on a status of each task item in the list of task items, a status of the order may be generated. In addition, in certain instances, the customer may be informed of an exception that occurs during the order process.

FIG. 1 illustrates an example predictive order status system 100 according to teachings of the present disclosure. The predictive order status system 100 may be one component provided by a cloud management and brokerage portal. The portal enables a central IT user to order computing infrastructure. The predictive order status for computing infrastructure is based on the object model that defines the computing resources, a policy engine that enforces rules of consumption, configuration, and provisioning of the computing resources, and a state engine that applies policies to the computing resources when they are in use.

According to an aspect of the present disclosure, the predictive order status system 100 includes a client computing device 102 and a predictive order status computing system 104. The system 100 further comprises a data source 106 that may be one or more databases comprising an organized collection of data for the predictive order status display system 100.

The data source 106 stores order summary information and order progress log information that includes order progress values that are used by the predictive order status system 104. Order summary information includes a list of one or more computing components associated with an ordered computing environment 108. Order progress log information includes a representation of a current order progress and past order progress. When an order is placed, an order summary file may be created including the list of one or more computing components and an order progress log file may be created to detail each step of the order progress.

Nevertheless, the data source 106 may store any suitable type of information for order status analysis of the ordered computing environment 108. Although the data source 106 is shown as being located on, at, or within the predictive order status computing system 104, it is contemplated that the data source 106 can be located remotely from the predictive order status computing system 104, such as on, at, or within a memory of host or virtual object of the computing environment 108.

The predictive order status computing system 104 includes a predictive order status application 126. The predictive order status application 126 communicates with external providers 110 and internal providers 112 to establish a list of representative task items associated with building and implementing an ordered computing environment 108 having one or more resources, monitor the list of task items, determine a status of building and implementing the computing environment, and report holds or exceptions to building and implementing the computing environment. The list of representative task items may include a list of representative task items for the computing environment as a whole and a list of representative task items, e.g., sub-tasks, for each of a plurality of resources associated with the computing environment 108. The list of representative items together represents a complete or substantially complete process of building and provisioning the computing environment 108. This may include physical, virtual, and/or logical setup of the computing environment 108, installing an operating system and/or application software, and configuring resources including parameters of the operating system and/or application software. Thus, each representative task item represents a segment of an order process for completing the order or a part of the process as a whole. Each sub-task may represent a segment of a process for completing a task. Certain tasks may be dependent upon the completion of others and certain sub-tasks may be dependent upon the completion of others. The data source 106 stores a list of task items for each of a plurality of types of computing environments that are buildable and configurable using the portal.

The client computing device 102 and the predictive order status computing system 104 communicate with one another using a communications network 114. Nevertheless, the client computing device 102 and the predictive order status computing system 104 may communicate with one another in any suitable manner. For example, the client computing device 102 and predictive order status computing system 104 communicate with each other using wireless, wired, and/or optical communications. In one specific embodiment, the client computing device and the predictive order status computing system 104 communicate with one another using the communication network 114, such as the Internet, an intranet, or other wired and/or wireless communication networks. In another embodiment, the client computing device and the predictive order status computing system 104 communicate using any suitable protocol or messaging scheme.

As an example, the client computing system 102 and the predictive order status computing system 104 communicate data in packets, messages, or other communications using a common protocol, e.g., Hypertext Transfer Protocol (HTTP) and/or Hypertext Transfer Protocol Secure (HTTPS). The one or more computing devices may communicate based on representational state transfer (REST) and/or Simple Object Access Protocol (SOAP). As an example, a first computer (e.g., the client computing device 102) may send a request message that is a REST and/or a SOAP request formatted using Javascript Object Notation (JSON) and/or Extensible Markup Language (XML). In response to the request message, a second computer (e.g., the predictive order status computing system 104) may transmit a REST and/or SOAP response formatted using JSON and/or XML. The systems may communicate without the use of a separate or a distinct network. Additionally, other embodiments contemplate that the modules employed by the predictive order status application 126 are executed by a computing device, discussed below.

In one example, the client computing device 102 transmits a request comprising an order for the ordered computing environment 108 to the predictive order status application 126 of the predictive order status computing system 104. The predictive order status application 126 of the predictive order status computing system 104 receives the request for the ordered computing system 108. The predictive order status application 126 receives the order, receives payment for the order, determines a bill of materials associated with the order, and determines one or more objects associated with the order by transmitting the bill of materials to the external providers 110 and the internal providers 112. The computing environment 108 may be the email system and comprise MICROSOFT™ Exchange servers to be provided by internal providers 112 and one or more web servers to be provided by external providers 110. These servers may be physical servers and/or virtual servers. Each exchange server may have one or more sub-tasks for completion and each web server may have one or more sub-tasks for completion.

The external providers 110 may provide public cloud computing offerings and other computing service offerings and the internal providers 112 may provide private cloud computing offerings and other computing service offerings. The central IT user may manage the public cloud computing offerings, the private cloud computing offerings, and the other computing service offerings comprising the computing environment 108 for the enterprise and the employees of the enterprise. As an example, the predictive order status application 126 may send application program interface (API) calls to the external providers 110 and the internal providers 112. The API calls may include authentication information that provides authentication information identifying the central IT user or enterprise. As an example, the predictive order status application 126 may send an API call to AMAZON™ Web Services (AWS™) that identifies the enterprise. The data source 106 may store authentication information for sending API calls to the external providers 110 and/or the internal providers 112 (e.g., unique identifiers or keys) and may store a list of available computing components and/or modifications available for upgrading the computing environment 108 that are selectable and configurable using the portal.

The external providers 110 may include third-party providers that provide computing resources and services. From the system perspective, the external provider 110 may be a connection to a system of the external provider whereby the system gathers information on the status of a task or sub-task in order to generate an order status. The services of the third party providers may include a collection of remote computing services including AMAZON™ Web Services (AWS™), VMware vCloud™ Air, RACKSPACE™, MICROSOFT AZURE™, CISCO INTERCLOUD™ and other similar computing resources. The provider may also provide hardware resources such as switches, servers and the like. The predictive order status application 126 may transmit one or more API calls and receive computing environment configuration information from one or more computers and one or more databases provided by the external providers. As an example, the predictive order status application 126 may query the data source 106 using the unique order identifier for referencing the one or more computing components and obtain information about the current computing environment configuration from the external providers 110. The internal providers 112 may include internal providers that provide computing resources and services. The services may include ServiceNow™, a configuration management database (CMDB), and other computing resources. The predictive order status application 126 may transmit one or more API calls and receive information from one or more computers and one or more databases provided by the internal providers. As an example, the predictive order status application 126 may query the data source 106 using the unique order identifier for referencing the one or more computing components and obtain information about the current computing environment configuration from the internal providers 112. The information from the external providers and the internal providers may be provided via one or more user interfaces.

The predictive order status application 126 determines whether the one or more objects are in stock or available by requesting information from the external providers 110 and the internal providers 112. The predictive order status application 126 determines an initial delivery date or an estimated fulfillment date, continually monitors and determines an order status of the order (e.g., on a daily basis), stores the order status in the data source 106, and provides the order status to the client computing device 102 upon request and/or by pushing the order status to the client computing device 102, e.g., via an automatically sent email each day or once a week and/or when an event occurs during the process, such as when a component is complete.

The initial delivery date may be an estimate that is based on other previously ordered computing environments that have been ordered and delivered. The data source 106 may store delivery times of the previously ordered computing environments. The predictive order status application 126 may query the data source 106 for the delivery times of the previously ordered computing environments and generate an estimate that is similar to the delivery times of the previously ordered computing environments.

In addition, the initial delivery date may be based on an estimated time it may take to physically, virtually, and/or logically construct each component of the computing environment. Each component may have an estimated delivery time stored in the data source 106. The predictive order status application 126 may query the data source for the estimated delivery time for each component of the computing environment and determine the delivery time based on the delivery time of each component of the computing environment. As an example, for a storage array including task items 1—physically install storage disk drives into the storage array (one day), 2—verify that storage disk drives are installed properly and are working within acceptable parameters (one day), and 3—logically provision storage space for storage pool (one day), the initial delivery date may be three days.

As an example, using the client computing device 102 or another computing device, the central IT user may search for and select from one or more service offerings using the cloud management and brokerage portal comprising a graphical user interface (GUI) indicating the available service offerings. The service offerings comprise a collection of interrelated objects provided by the external providers 110 and the internal providers 112. The objects may include storage components, server components, networking components, converged components, and abstracted components. The central IT user may select and order the computing environment 108 from the one or more service offerings. The central IT user may select an infrastructure as a service to support an upgrade of an email system. Thus, in one example, the ordered computing environment 108 comprises a new or an upgraded email system. As an example, one of the MICROSOFT Exchange servers may be overutilized and additional server capacity may be needed.

The predictive order status application 126 may be one or more servlets and one or more JSP files that perform functions on behalf of requests by the client computing device 102. The predictive order status application 126 determines whether the one or more objects are in stock or available for order by requesting information from the external providers 110 and the internal providers 112 via the API calls. As an example, the predictive order status application 126 executes one or more JSP files and delivers an HTML document including the representation to the client computing device 102.

The client computing device 102 may be a computer having one or more processors 116 and memory 118, including but not limited to a server, laptop, desktop, tablet computer, smartphone, or a dedicated electronic device having a processor and memory. The one or more processors 116 may process machine/computer-readable executable instructions and data, and the memory 118 may store machine/computer-readable executable instructions and data including one or more applications, including a web browser 120. The processor 116 and memory 118 are hardware. The memory 118 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like.

The web browser 120 may be a component of an application and/or service executable by the client computing device 102. For example, the web browser 120 may be a single unit of deployable executable code. The web browser 120 may be one application and/or a suite of applications. As an example, the web browser may be INTERNET EXPLORER®, SAFARI®, CHROME™, FIREFOX®, OPERA™, and other applications. The web browser 120 may be part of another native application executed by the client computing device 102 (e.g., a web view within the native application) and/or the web browser 120 may be a mobile web browser. According to an example embodiment, the web view may be embedded in a mobile application (e.g., an app) downloaded from a digital distribution application platform that allows users to browse and download applications developed with mobile software development kits (SDKs) including the App Store and GOOGLE PLAY® among others. The app may be installed on the client computing device 102, which may have an iOS operating system or an ANDROID™ operating system, among other operating systems. The web browser 120 communicates messages to the predictive order status computing system 104 and receives messages from the predictive order status computing system 104, e.g., HTTP requests and corresponding HTTP responses. The responses may comprise requested content, including information associated with the ordered computing environment 108.

The client computing device 102 may further include an optional display and an input device. The display is used to display visual components of the web browser 120, such as at a user interface. In one example, the user interface may display a user interface of the web browser 120. The display can be a liquid-crystal display, a light-emitting diode display, an organic light-emitting diode display, a touch screen display, an e-ink display, an e-paper display, and other displays. The input device is used to interact with the web browser 120 and may include a mouse, a keyboard, a trackpad, and/or the like. The input device may be included within the display if the display is a touch screen display. The input device allows a user of the client computing device 102 to manipulate and interact with the user interface of the web browser 120.

The predictive order status computing system 104 may be a computer having one or more processors 122 and memory 124, including but not limited to a server, laptop, desktop, tablet computer, smartphone, or a dedicated electronic device having a processor and memory. The one or more processors 122 may process machine/computer-readable executable instructions and data, and the memory 124 may store machine/computer-readable executable instructions and data including one or more applications, including the predictive order status application 126. The predictive order status application 126 may be a web application. In addition, predictive order status application 126 may provide an application program interface (API) so that other software tools can consume derived information for other purposes, such as providing status information. The processor 122 and memory 124 are hardware. The memory 124 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like.

The computing environment 108 may be provided in whole or in part through a converged infrastructure. The computing environment 108 is monitored by the predictive order status application 126 of the predictive order status computing system 104. In a specific example of a computing environment 108 that includes a converged infrastructure (CI), the resources 128 may include hardware resources (e.g., hosts 206) and/or virtual resources (e.g., virtual machines 208*a*, virtual switches 208*b*, and/or virtual storage objects 208*c*) executed by the hosts 206 of the converged infrastructure (See FIG. 2). In this case, the CI may include thousands of physical objects that make up a system that each executes tens or even hundreds of thousands of virtual objects.

The resources 128 of the computing environment 108 represent hardware resources and/or one or more virtual objects executed on those hardware resources, which may be implemented in a virtual computing environment. The virtual computing environment may be embodied in any computing system that provides virtualized components (virtual objects) executed on one or more physical hosts. Converged infrastructures typically refer to computing systems implemented in a virtual computing environment that includes a structured combination of multiple virtual objects that are executed on independently functioning hardware resources commonly referred to as hosts. Converged infrastructures implemented in a virtual computing environment may be advantageous in that they are dynamically configurable to continually adapt to ever changing requirements typically exhibited by modern converged infrastructures. Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large data center environments, converged infrastructures may involve a pool of server, storage and networking capacities, typically virtualized, that can be shared by multiple applications.

In another aspect, a converged infrastructure comprises a combination of converged infrastructures configured in a cloud computing environment. While some examples disclosed herein reference converged infrastructures, also sometimes referred to as unified computing systems, fabric-based computing systems, and dynamic infrastructures, systems and method described herein may be applied to other computing environments 108.

Resources 128 of a converged infrastructure may include resources, such as data processing devices, data storage devices, servers, networking equipment, and/or other computing devices. A converged infrastructure includes a combination of these devices that are packaged and interconnected in a standardized manner for ease of maintenance and use. For example, a converged infrastructure 200 such as that shown in FIG. 2 includes components found in Vblock™ System infrastructure packages available from VCE, LLC, which is located in Richardson, Tex. Converged infrastructures are often implemented in environments where relatively high reliability and/or availability are desired, such as in an enterprise environment. Nevertheless, it is contemplated that any computing environment, such as a computer cluster, computing grid, blade array, and/or other computing infrastructure may have an order status determined using the teachings of the present disclosure.

FIG. 2A illustrates an example converged infrastructure 200 that may be implemented as the computing environment 108 according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs are managed by a hypervisor that provides a virtual architecture for each VM's operation and controls various aspects of their operation. One example of a suitable hypervisor includes the VMWARE ESX™ software suite that is available from VMware Corporation, which is located in Palo Alto, Calif.

Figure 2B:
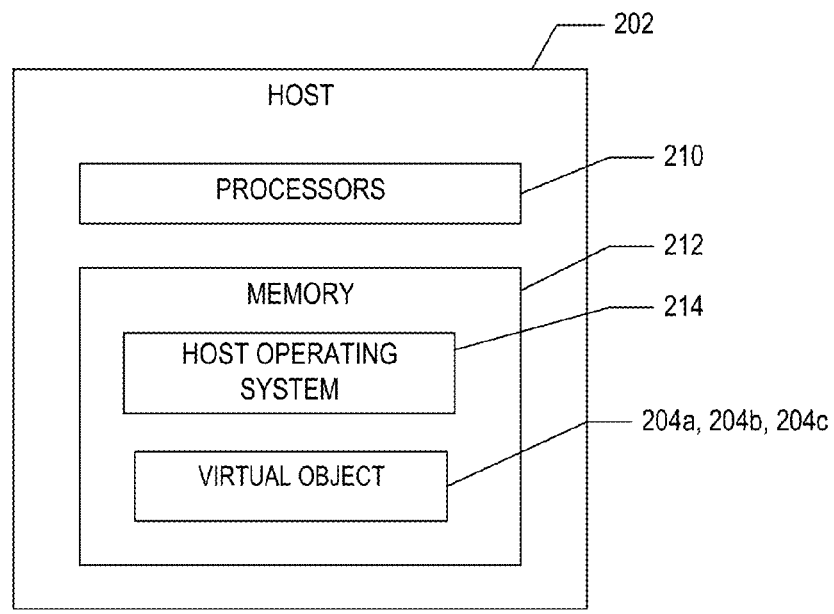

FIG. 2B illustrates an example host 202 implemented on each converged infrastructure 200 according to one aspect of the predictive order status system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as a blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 214 controls and manages the operation of the virtual objects executed on the host 202. For example, control signaling for starting, stopping, and/or changing operating parameters of each virtual object is managed through the host operating system 214.

Figure 3:
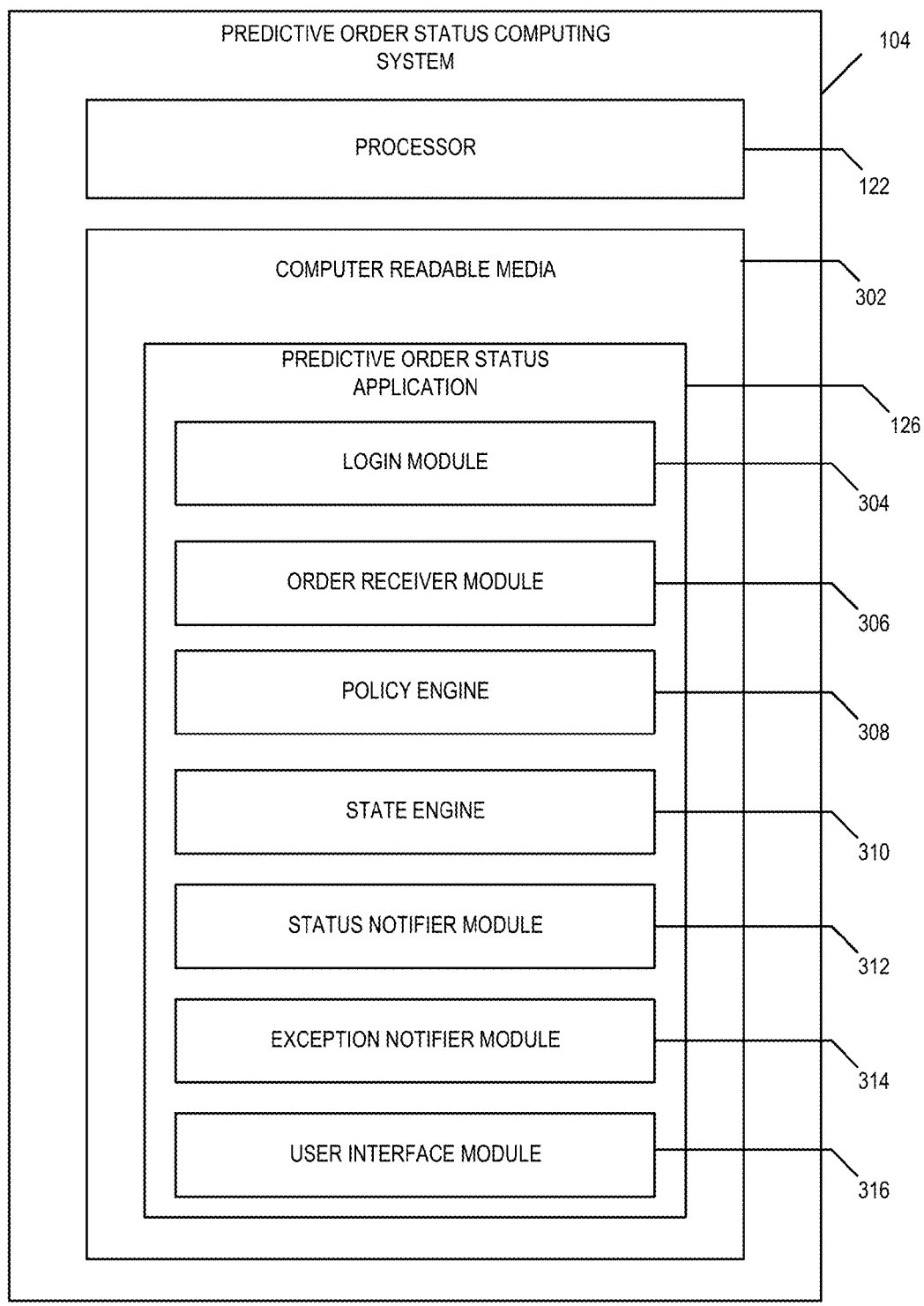
FIG. 3 illustrates a block diagram of an example predictive order status application executed by the predictive order status system according to one embodiment of the present disclosure.

FIG. 3 illustrates a block diagram of the predictive order status application 126 of the predictive order status computing system 104 according to an example embodiment. The predictive order status computing system 104 includes computer readable media (CRM) 302 on which the predictive order status application 126 is stored. The computer readable media 302 may include volatile media, nonvolatile media, removable media, non-removable media, and/or another available medium that can be accessed by the processor 122. By way of example and not limitation, the computer readable media 302 comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, for example.

The predictive order status application 126 includes a login module 304 that receives login information sent from the client computing device 102. The login module 304 may be in communication with a user interface module 316 (described below) that generates a user interface for receiving the login information from the client computing device 102 and returning the portal. The login information may include a representation of a username and a password. The username and password may be encrypted by the client computing device 102 using transport layer security (TLS), secure sockets layer (SSL), and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the predictive order status computing system 104 without directly sending the username and password to the predictive order status computing system 104 via the communications network 114.

Figure 5A:
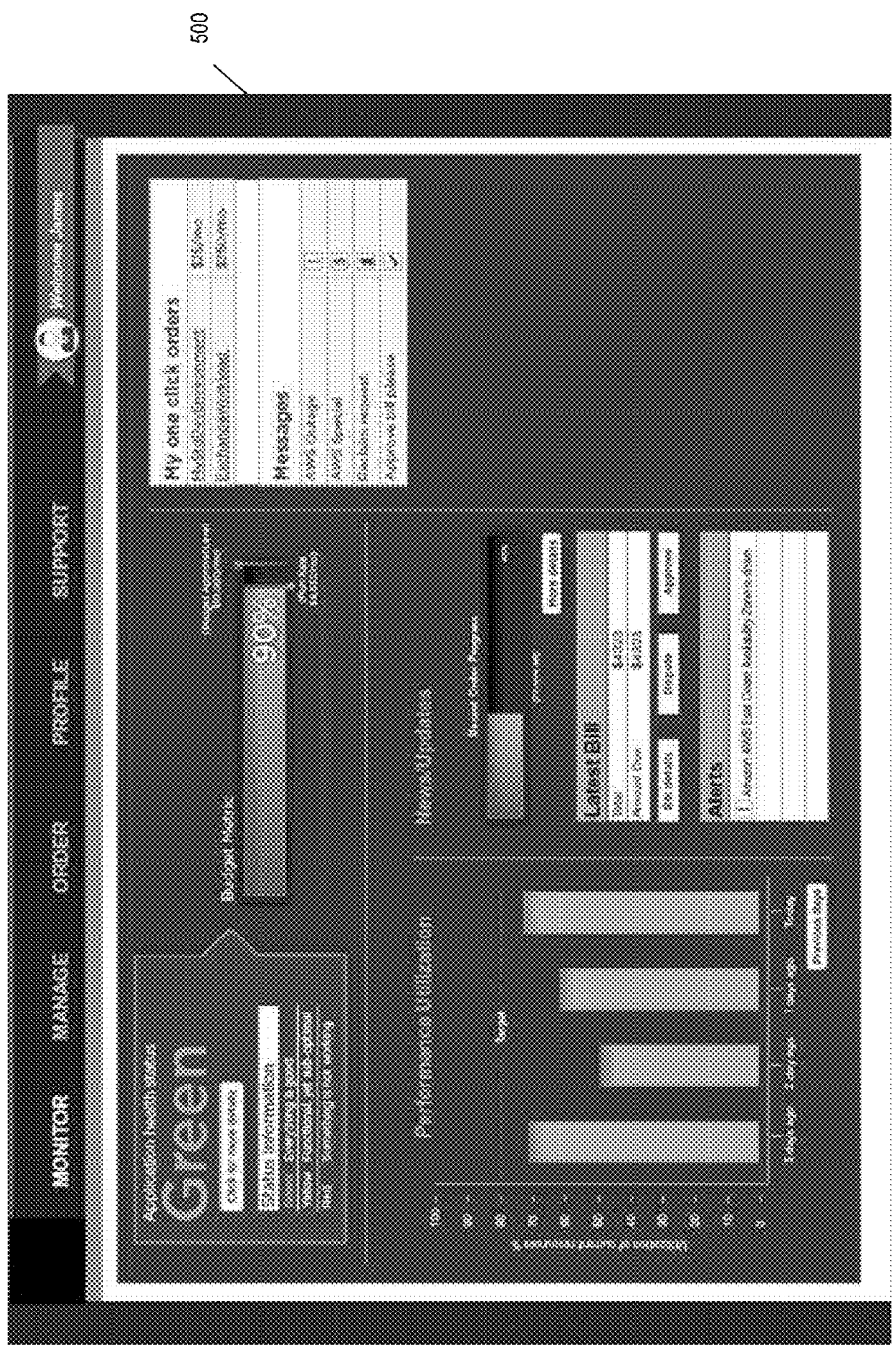
FIGS. 5A and 5B illustrate screenshots of a portal provided by the predictive order status application according to one embodiment of the present disclosure.

If the login information is not valid, the login module 304 transmits an error message to the client computing device 102. However, if the login information is valid, the login module 304 transmits a portal user interface to the client computing device 102. An example user interface is shown in FIG. 5A. As an example, the login module 304 transmits resources and user interface elements to generate a web page for receiving an order from the client computing device 102.

The predictive order status application 126 further includes an order receiver module 306 that receives the request with the order for the ordered computing environment 108. The order receiver module 306 receives the order from the client computing device 102, receives payment information for the order from the client computing device 102 (e.g., a current monthly budget). As an example, the central IT user may have to adhere to the current monthly budget set by the enterprise. When placing the order for the ordered computing environment 108, the central IT user may not order computing resources beyond what is allowed by the current monthly budget. If the payment information is invalid, e.g., the order exceeds a current budget, the order may be denied or cancelled. However, if the payment information is valid, the order proceeds. The order receiver module 306 determines a bill of materials for the ordered computing environment 108, and requests stock information for resources 128 of the ordered computing environment 108 from the external providers 110 and the internal providers 112 via one or more API calls. Based on the stock information, the order receiver module 306 places the order in an order queue with the external providers 110 and the internal providers 112 via the one or more API calls. As an example, if a particular external provider does not have an appropriate amount of stock to complete the order, the order will not necessarily be placed into an order queue with that particular external provider. In some instances, the central IT user may be presented with an alternative configuration for the order. However, if a particular external provider does have an appropriate amount of stock to complete the order, the order may be placed into an order queue with that particular external provider. The order receiver module 306 requests that the central IT user confirm a final configuration for the order.

Once the central IT user accepts the final configuration, the order receiver module 306 assigns the order with a unique order identifier for referencing the order, e.g., ABCD1234, and determines an order date and/or an order time for the order. The unique order identifier is stored in the data source 106 along with the order date and/or the order time for the order. In addition, a total order process time is stored for the order. As an example, the order date may be Jan. 1, 2014 and the total order process time may be forty five days.

The predictive order status application 126 further includes a policy engine 308 that comprises a rules engine that leverages and enforces rules of consumption, configuration, instantiation, and provisioning for the ordered computing environment 108. The rules may be related to role based access for users of the computing environment 108, the taxonomy or configuration of the computing environment 108, the availability of the computing environment 108, and the reliability of the computing environment 108. As an example, a policy may comprise one or more rules based on a goal of maintaining 99.999% (five nines) availability and reliability for the ordered computing environment 108. This policy may be set by the administrator of the enterprise. As another example, a policy may comprise one or more rules to configure the computing environment with internal providers 110 rather than external providers 112. As an additional example, a policy may comprise one or more rules to configure the computing environment 108 to have high performance. As an even further example, a policy may comprise one or more rules to configure the computing environment 108 with providers (e.g., the internal providers 110 and the external providers 112) having a high rating. The rating may be provided by the administrator and/or the employees. These policies may be used to populate the bill of materials for the ordered computing environment 108. As another example, although a software developer for the enterprise would prefer to order a single server, the availability policy or rule set by the administrator of the enterprise may only allow the software developer to order two servers that are geographically located a particular distance from one another. The rules may be based on a specified service level agreement (SLA) parameter or other factors. The policy engine 308 is used by the predictive order status application 126 to build the ordered computing environment 108. Policies provided by the policy engine 308 may be applied to each object currently comprising the computing environment 108 and objects to be ordered for the computing environment 108. The policy engine 308 may validate each object of the computing environment 108 by receiving a representation of the object according to the object model. Thus, the object model is validated against each rule of the policy engine 308.

The predictive order status application 126 further includes a state engine 310 that applies various policies for the ordered computing environment 108 while the computing environment 108 is in use. The state engine 310 is used to provide a quality of service related to security or performance while the computing environment 108 is in use. As an example, one of the policies may be related to security of the computing environment that provides the email system while in use. Another policy may be one or more rules related to increases in overall utilization of the computing environment 108 or utilization of one object of the computing environment 108. The state engine 310 provides realtime information and data for ensuring that the ordered computing environment continually meets the policy rules established by the policy engine 308. The state engine 310 also may continually monitor the status of the one or more representative tasks associated with the order and ensure that the objects associated with the tasks meet the policies.

The predictive order status application includes a status notifier module 312 that monitors the status of the one or more representative tasks associated with the order and stores status information in the data source 106 upon receipt from the external providers 110 and the internal providers 112. The status information is associated with the order using the unique order identifier.

The status notifier module 312 receives a unique order identifier from the client computing device 102, e.g., ABCD1234, queries the data source 106 using the unique order identifier, and determines a list of one or more representative tasks or task items for the ordered computing environment 108 based on the unique order identifier that may be stored in the data source 106. Next, the status notifier module 312 determines a status of each of the one or more representative tasks for the ordered computing environment 108 based on the unique order identifier, and provides a current overall status in addition to optional other information for the ordered computing environment based on the unique order identifier.

Each task on the list may have an assigned weight or percentage value and a specific assigned administrator at a particular provider, e.g., a particular external provider or a particular internal provider. As an example, the list of representative tasks for building, provisioning, and deploying a VBLOCK system may include ten distinct tasks and each distinct task has ten sub-tasks. Thus, in a simple example, each task may represent 10% of the entire process to build, provision, and deploy the ordered computing environment 108. Each sub-task may represent 1% of the entire process to build, provision, and deploy the ordered computing environment, and represent 10% to complete the related task. Another example list of representative tasks for a VBLOCK system is shown below. As shown in the table below, the current overall status for the completed tasks is 50%. This may not include a simulated percentage value of the tasks that are not complete.

TABLE 1

| Task Status | Task Name | Task Administrator | Task Weight | Exception Status |
|---|---|---|---|---|
| Complete | Task 1 | Internal Provider A | 10% | NO |
| Complete | Task 2 | Internal Provider B | 10% | NO |
| Complete | Task 3 | Internal Provider A | 15% | NO |
| Not Complete | Task 4 | Internal Provider C | 5% | NO |
| Not Complete | Task 5 | External Provider A | 10% | NO |
| Complete | Task 6 | External Provider B | 10% | NO |
| Not Complete | Task 7 | External Provider C | 10% | NO |
| Not Complete | Task 8 | External Provider A | 10% | NO |
| Not Complete | Task 9 | Internal Provider B | 15% | YES |
| Complete | Task 10 | Internal Provider A | 5% | NO |

The current overall status for the ordered computing environment may be a percentage value and may include a simulated percentage value. As an example, at a particular interval of time, e.g., at the end of each business day, the status notifier module 312 receives a status for each task for the ordered computing environment 108 from the external providers 110 and the internal providers 112 by sending API calls. The status notifier module 312 stores the status for each task (and each corresponding sub-task) in the data source 106. In the event that the status notifier module 312 does not receive a status for each task for the ordered computing environment from the external providers 110 and the internal providers 112 or receives an indication that a task is not completed, the status notifier module may simulate or estimate progress for the regular interval, e.g., a percentage based on the task weight. As an example, the simulated progress may be based on task weight multiplied by an elapsed time since the order was placed/total build time. For example, the ordered computing environment may include ten tasks each having an identical weight of 10%. As an example, a first task may represent 10% of the entire process to build, provision, and deploy the ordered computing environment. If the request for the overall status is received on the tenth day of a forty-five day total time, then the simulated progress of the first task may be: 0.1 (10/45) =2.22% of the overall status. The simulated progress may also be another value based on the task weight and/or the current day/total build time.

If the status notifier module 312 receives a completed status for one or more tasks for the ordered computing environment from the external providers 110 and the internal providers 112, the status notifier module 312 determines the current status. As an example, an external provider indicates that one of the representative tasks to build a storage device for the computing environment is completed. The status notifier module 312 determines that the current overall status advances according to the weight of the representative task, e.g., 10%.

As an example, on a particular day, the status notifier module 312 receives the unique order identifier from the client computing device 102, queries the data source 106 for the list of representative tasks associated with the unique order identifier, determines how many of the tasks are completed, determines the date that the order was placed, determines a current overall status of the ordered computing environment and transmits a message to the client computing device 102 indicating the current overall status of the ordered computing environment 108. The client computing device 102 may receive the message and display the current overall status as a status bar representing the current overall status via the web browser 120.

In one example case, ten days have passed since the order was placed having a forty-five day completion time, one of the representative tasks has been completed (10%), and nine of the representative tasks each having a task weight of 10% have not been completed. As an example, the current overall status may be 10%+(0.9*10/45)=30%. Certain tasks in the overall process may not be completed until nearly the end of the total build time (e.g., day 43 or 44 of a 45 day build time), but the current overall status does not necessarily reflect this. In other words, the current overall status does not necessarily reflect whether the tasks are completed or not completed, rather the current overall status provides a simulated value.

In other embodiments, each day may have a different weight. A day earlier in the order completion process may have a weight that is less than or greater than a weight later in the order completion process. In other words, the weighting of each day for each task may be linear or based on another technique. If the weighting for each day is linear, then the current overall status would be determined by multiplying each task weight by the current day/total build time. In other embodiments, one task may not simulate completion if it is dependent upon another task and/or another sub-task that has not yet been completed.

In additional embodiments, the status notifier module 312 may push status updates that may have the current overall status to the client computing device 102. As an example, the client computing device 102 may request that regular status updates be provided once a week, every other week, at another time interval, and/or when a certain event occurs, e.g., a task is completed or a sub-task is completed. The status notifier module 312 may send the current overall status to the client computing device 102. As an example, the status notifier module 312 may send the current overall status to an email address associated with the central IT user. The email may include a uniform resource locator (URL) that when selected directs the central IT user to the portal to display the current overall status for the order. The predictive order status application 126 includes an exception notifier module 314 that transmits a message indicating that an exception has occurred to the client computing device 102. The message may be sent when a request for the current overall status is received from the client computing device 102. The message also may be pushed to the client computing device 102.

The exception notifier module 314 determines an exception status for the order. The exception status is based on an exception status for each task in the list. As an example, the exception notifier module 314 receives a message from the external providers and/or the internal providers 112 that an exception has occurred regarding at least one of the one or more representative tasks associated with the ordered computing environment 108. The exception notifier module 314 forwards information associated with the exception to the client computing device 102. The exception may occur if there is a possibility that the ordered computing environment 108 will not be delivered within the total build time or the estimated fulfillment date, which may be a guaranteed delivery date.

The following illustrates an example exception that occurs for the ordered computing environment 108. The ordered computing environment 108 may include an object, (e.g., a storage device) and a third task may be related to delivery of the object. As an example, the storage device associated with the third task is on back order and unavailable from an external provider for two months. In this case, the ordered computing environment 108 will not be delivered within the total build time and extend the total build time, resulting an exception for at least the third task. If an exception occurs, the current overall status may freeze or pause at a particular value until the exception ends and/or the current overall status may decrement by a value based on the task with the exception. As an example, if an exception occurs on day two of an order process having a forty five day completion time, the current overall status may freeze at a particular value. The exception may be rectified on day ten of the order process. As an example, the external provider receives a large shipment of storage devices that was not expected. At that time, the current overall status may then increase to a new value based on the weight of the not completed tasks, the weight of the completed tasks, and a current day in the order process. The exception, however, may not freeze or decrement the current overall status and the current overall status may not be modified by the exception.

In certain instances, if an exception occurs, user input may be needed and the exception notifier module 314 may request the user input. As an example, depending upon the user input, the order may be cancelled and/or modified if the order cannot be met within the total build time. As an example, the central IT user may have ordered storage device A from external provider StorageHouse. However, the central IT user may be informed that StorageHouse does not have enough stock of storage device A and will not be able to fulfill the order within the total build time.

The external provider StorageHouse transmits a message to the predictive order status application 126 via its API that indicates that there is not enough stock of storage device A. The predictive order status application 126 receives the message via the API and provides the message to the client computing device 102. The message indicates that the ordered computing environment 108 may not be fulfilled within the total build time and may include substitution options to complete the order within the total build time. As an example, the predictive order status application 126 may send the message via email, text message, push notification, or provide a notification to the user a next time that the user logs into the portal. The client computing device 102 receives the message and the central IT user may make a substitution and select storage device B rather than storage device A. The central IT user may substitute storage device A with storage device B having a storage capacity of ten terabytes so that the computing environment 108 may be built within the total build time. The predictive order status application 126 receives the substitution from the client computing device 102 and forwards the substitution to the external providers 110 and/or the internal providers 112 via the one or more API calls to remove the exception. In addition, the current overall status may be modified based on the substitution.

Figure 5B:
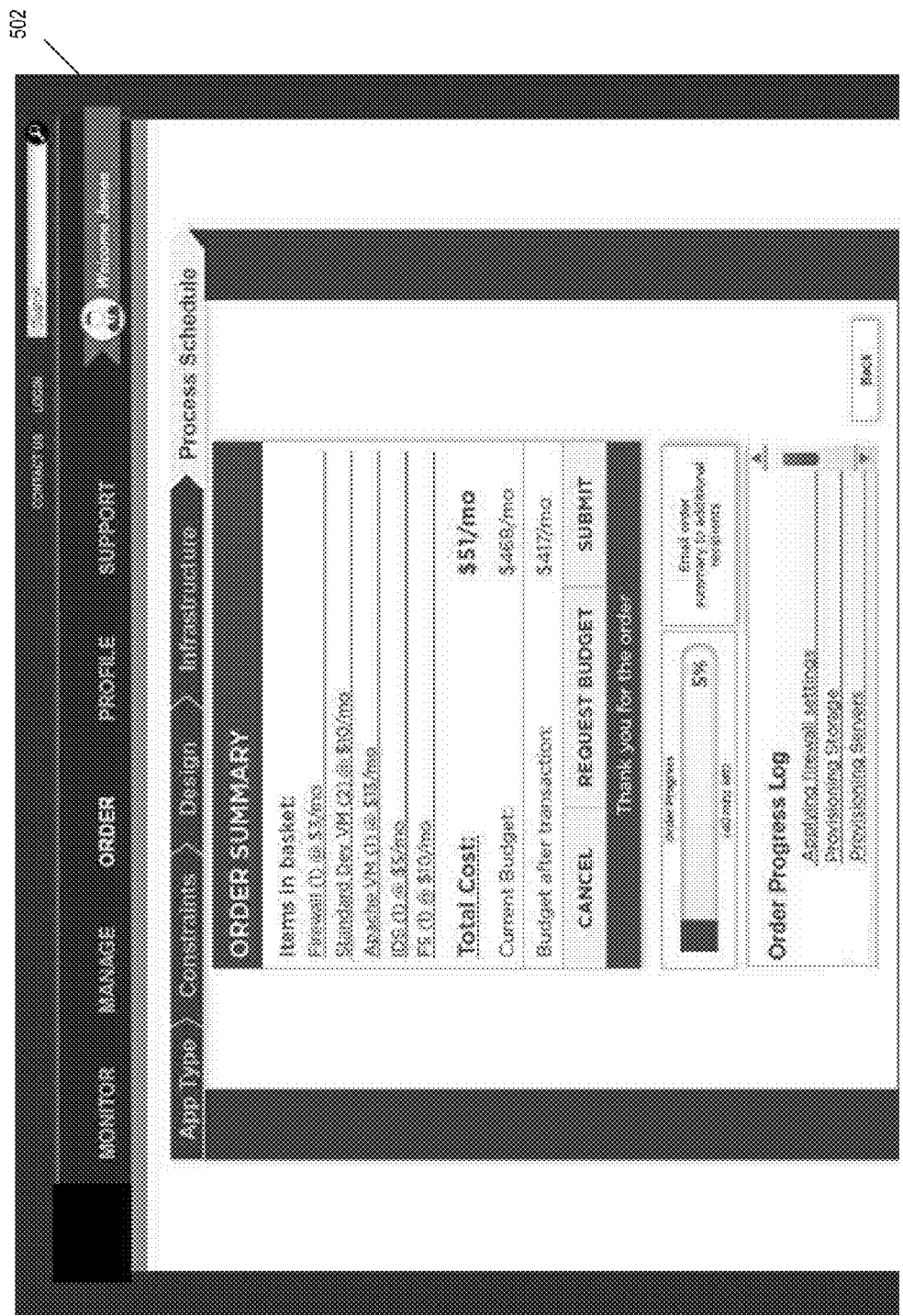

Additionally, the predictive order status application 126 includes a user interface module 316 that generates a user interface of the predictive order status application 126. The user interface module 316 may generate a native and/or web-based graphical user interface (GUI) that accepts input and provides output. The user interface module 316 may send data to other modules of the predictive order status application 126 and receive data from other modules of the predictive order status application 126. As an example, the user interface module 316 visually generates and/or displays an indication of the current overall status of the ordered computing environment by showing a progress bar that is partially shaded green based on the current percentage, e.g., 30%. An example is shown in FIG. 5B.

Two other example additional lists of representative tasks for a VBLOCK system are shown in the tables below. In the first table, there are no exceptions. In the second table, there is an example exception that does not jeopardize the estimated fulfillment date. Unlike the example shown above in Table 1, in the examples shown below, the tasks do not have assigned weights that are used to determine the current overall status. In addition, the current overall status is not based on whether the tasks have been completed or not completed. Rather, the current overall status is based on the amount of time that has passed since the order was placed. As shown below, on day 1 the current overall status is 10%. The current overall status continues to increase by 10% every five days whether or not the tasks are completed unless there is an exception that jeopardizes the estimated fulfillment date. In addition, the current overall status includes a computing environment health status, e.g., the exception status, which is one of Green, Yellow, or Red. The health status may be other values such as a letter grade or a numerical score. However, in this example, Green indicates that the computing environment provisioning process is on track to be complete within the estimated fulfillment date. Yellow indicates that the estimated fulfillment date is at risk to not be completed within the estimated fulfillment date. Red indicates that the estimated fulfillment date may not be met. In certain instances, components may be on back order with the external providers 110 or internal providers 112 or could be on engineering hold with the external providers 110 or internal providers 112. In some cases, components may be reassigned from one computing environment that is not at risk for meeting the estimated fulfillment date to another computing environment that is not at risk for a late estimated fulfillment date.

TABLE 2

|  | Day 1 | Day 5 | Day 10 | Day 15 | Day 20 | Day 25 | Day 30 | Day 35 | Day 40 | Day 45 |
|---|---|---|---|---|---|---|---|---|---|---|
| Contract Signed | Start Green |  |  |  |  |  |  |  |  |  |
| Logical Configuration Survey | Start Green | Green Not Done | Done |  |  |  |  |  |  |  |
| Orders for Equipment | Start Green | Green Not Done | Green Not Done | Green Not Done | Green Not Done | Green Not Done | Green Not Done | Done |  |  |
| Physical configuration |  |  |  |  |  | Start Green | Green Not Done | Green Not Done | Green Not Done | Done |

TABLE 2-continued

| | Day 1 | Day 5 | Day 10 | Day 15 | Day 20 | Day 25 | Day 30 | Day 35 | Day 40 | Day 45 |
|---|---|---|---|---|---|---|---|---|---|---|
| Logical Configuration | | | | | | Start Green | Green Not Done | Green Not Done | Green Not Done | Done |
| Ship to Customer | | | | | | | | | Start Green | Done |
| Vblock Up and running | | | | | | | | | | Done |
| Overall | Green 10% Complete | Green 20% Complete | Green 30% Complete | Green 40% Complete | Green 50% Complete | Green 60% Complete | Green 70% Complete | Green 80% Complete | Green 90% Complete | Green 100% Complete |

TABLE 3

| | Day 1 | Day 5 | Day 10 | Day 15 | Day 20 | Day 25 | Day 30 | Day 35 | Day 40 | Day 45 |
|---|---|---|---|---|---|---|---|---|---|---|
| Contract Signed | Start Green | | | | | | | | | |
| Logical Configuration Survey | Start Green | Green Not Done | Done | | | | | | | |
| Orders for Equipment | Start Green | Green Back order | Green Back order | Green Back order | Green Back order | Green Back order | Green Back order | Yellow Back order | Green Adjusted | Done |
| Physical configuration | | | | | Start Green | Green Not Done | Green Not Done | Green Not Done | Done | |
| Logical Configuration | | | | | | Start Green | Green Not Done | Green Not Done | Green Not Done | Done |
| Ship to Customer | | | | | | | | | Start Green | Done |
| Vblock Up and running | | | | | | | | | | Done |
| Overall | Green 10% Complete | Green 20% Complete | Green 30% Complete | Green 40% Complete | Green 50% Complete | Green 60% Complete | Green 70% Complete | Yellow 80% Complete | Green 90% Complete | Green 100% Complete |

As an example, an order provisioning process for a VBLOCK may take forty-five days. As shown in Tables 2 and 3, the process may include eight steps including (1) order contract signed, (2) logical configuration survey completed, (3) orders for equipment entered into hardware and software provider systems using API calls, e.g., the external providers 110 and the internal providers 112, (4), orders physically received in manufacturing facility, (5) physical configuration completed, (6) logical configuration completed, (7) shipment to customer completed, and (8) order up and running. Some of these steps may occur in parallel and some of the steps may be dependent upon other steps. Traditional order status systems indicate activity during the early part of the provisioning process and the latter part of the provisioning process. However, providing a customer with this literal status may indicate that the order is not being worked on. According to an example embodiment, the system 100 indicates that the status of the order continues to progress in the absence of exceptions.

On day 0, the order contract may be signed. On days −1 to day 43, the logical configuration survey may be completed via the portal by the central IT user or another user. The logical configuration survey ensures that the system is built based on client workload characteristics and will yield needed scale and performance characteristics for each application to perform optimally in a production environment. On days 0-43, the orders for equipment may be entered into hardware and software provider systems by sending API calls to the external providers 110 and the internal providers 112. This time represents the lead time for equipment shipping. Prior to day 44.5, the orders may be received from the hardware and software providers at the manufacturing facility. Prior to day 44.5, the physical configuration may be completed, the logical configuration may be completed, and the order may be shipped to the customer. After steps 1-7 are completed, the order may be up and running.

As soon as all components are ordered and received, the physical configuration is complete. The logical configuration depends upon the logical configuration survey. Once the logical configuration survey is completed, the logical build process may begin. However, the logical build process may not be completed until the logical configuration survey is complete.

In the first table, each of the steps has a health status and there is an overall health status for the computing environment 108. The status on day 1 is shown as "Green" and 10% complete. The contract is signed, the logical configuration survey starts, and the orders for equipment start. On day 5, the status is shown as "Green" and 20% complete. On day 10, the status is shown as "Green" and 30% complete. On day 15, the status is shown as "Green" and 40% complete. On day 20, the status is shown as "Green" and 50%. The physical configuration begins. On day 25, the status is shown as "Green" and 60%. The logical configuration begins. On day 30, the status is shown as "Green" and 70%. On day 35, the status is shown as "Green" and 80%. On day 40, the computing environment 108 is shipped to the customer. The status is shown as "Green" and 90%. On day 45, the computing environment 108 is up and running. The status is shown as "Green" and 100%.

In the second table each of the steps has a health status and there is an overall health status. The status on day 1 is shown as "Green" and 10% complete. The contract is signed, the logical configuration survey starts, and the orders for equipment start. On day 5, the status is shown as "Green" and 20% complete. However, in this case, components of the computing environment 108 are on back order. At this time, the estimated fulfillment date is not in jeopardy. On day 10, the status is shown as "Green" and 30% complete. On day 15, the status is shown as "Green" and 40% complete. On day 20, the status is shown as "Green" and 50%. The physical configuration begins. On day 25, the status is shown as "Green" and 60%. The logical configuration begins. On day 30, the status is shown as "Green" and 70%. On day 35, the status is shown as "Yellow" and 80%. On day 40, the computing environment 108 is shipped to the customer. The status is shown as "Green" and 90%. On day 45, the computing environment 108 is up and running. The status is shown as "Green" and 100%.

The information shown in each of tables 1-3 may be stored in one or more data structures or files in the data source 106 and transmitted to the client computing device 102 by the predictive order status application 126 of the predictive order status computing device 104. The user interface module 316 presents the information via the web-based graphical user interface.

It should be appreciated that the modules described herein are provided only as examples, and that the predictive order status application 126 may have different modules, additional modules, or fewer modules than those described herein. For example, one or more modules as described in FIG. 3 may be combined into a single module. As another example, certain modules described herein may be encoded on, and executed on other computing systems, such as on one of the hosts 202 of a converged infrastructure 200 as described above with reference to FIGS. 2A and 2B.

Figure 4:
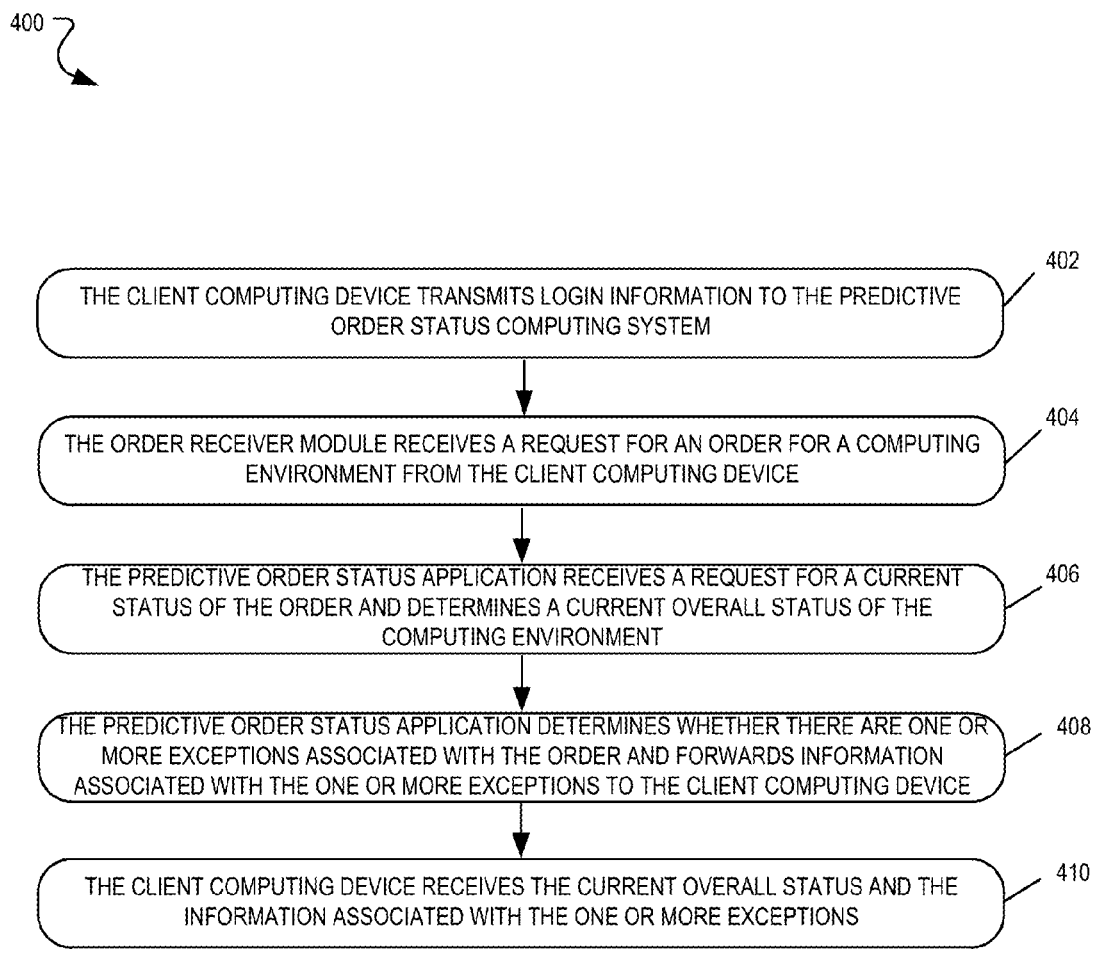
FIG. 4 illustrates an example process performed by the predictive order status application according to one embodiment of the present disclosure.

FIG. 4 illustrates a flowchart of a process 400 for requesting a current overall status of the ordered computing environment 108 according to an example embodiment. The process 400 shown in FIG. 4 begins in step 402. In step 402, the client computing device 102 transmits login information to the login module 304 of the predictive order status application 126 of the predictive order status computing system 104. The login information may include username information and password information, among other two-factor authentication information. The login module 304 verifies that the login information is valid. If the login information is not valid, the login module 304 transmits an error message to the client computing device 102. If the login information is valid, the login module transmits resources and user interface elements to generate a web page for receiving an order from the client computing device 102, e.g., the portal shown in FIG. 5A.

In step 404, the order receiver module 306 receives the request for the order for the ordered computing environment 108 from the client computing device 102. The request may include the unique order identifier. The order receiver module 306 receives the order from the client computing device 102, and receives payment and/or budget information for the order from the client computing device 102. If the payment information is invalid, e.g., the order exceeds a current monthly budget, the order may be denied or cancelled. However, if the payment information is valid, the order proceeds. Next, the order receiver module 306 determines a bill of materials for the ordered computing environment 108, and requests stock information for resources 128 of the ordered computing environment 108 from the external providers 110 and the internal providers 112 via API calls.

Based on the stock information, the order receiver module 306 places the order in an order queue with the external providers 110 and the internal providers 112 via API calls. As an example, if a particular external provider does not have an appropriate amount of stock to complete the order, the order will not be placed into an order queue with that particular external provider. However, if a particular external provider does have an appropriate amount of stock to complete the order, the order may be placed into an order queue with that particular external provider. The central IT user may be informed that an alternative configuration is available and request that the central IT user accept the alternative configuration. The order receiver module 306 requests that the central IT user to confirm a final configuration for the order. Once the central IT user accepts a final configuration for the order, the order receiver module 306 assigns the order with a unique order identifier for referencing the order. The unique order identifier is stored in the data source 106. Construction of the ordered computing environment 108 begins.

In step 406, the status notifier module 312 of the of the predictive order status application 126 of the predictive order status computing system 104 receives a request for a current status of the order. As an example, on a particular day, the status notifier module 312 receives the unique order identifier from the client computing device 102, queries the data source 106 for the list of representative tasks associated with the unique order identifier, determines how many of the tasks are completed, determines how many of the tasks are not completed, determines how many of the sub-tasks are completed, determines how many of the sub-tasks are not completed, determines the date that the order was placed, determines a current overall status of the ordered computing environment, and transmits a message to the client computing device 102 indicating the current overall status of the ordered computing environment 108.

In step 408, the exception notifier module 314 of the predictive order status application 126 of the predictive order status computing system 104 determines whether there are any exceptions associated with the order. This may include the health status of each task and the current overall health status. As an example, the exception notifier module 314 may receive a message from the external providers and/or the internal providers 112 that an exception has occurred regarding at least one of the one or more representative tasks associated with the ordered computing environment 108. If there are one or more exceptions associated with the order, the exception notifier module 314 forwards information associated with the one or more exceptions to the client computing device 102 and may request that the central IT user select an alternative configuration, if available. Otherwise, the exception notifier module 314 does not forward any information to the client computing device 102.

In step 410, the web browser 120 of the client computing device 102 receives the current overall status and the information associated with the one or more exceptions from the predictive order status application 126 of the predictive order status computing device 104 and generates a web page showing a representation of the current overall status and the information associated with the one or more exceptions. In one example, the web page shows a status bar indicating the current overall status. For the one or more exceptions, the web page may show user interface elements that attract attention.

Although FIG. 4 describes one example of a process that may be performed by the predictive order status application 104 to predict a current order status for an order and provide exception information, the features of the disclosed process may be embodied in other specific forms without deviating from the spirit and scope of the present disclosure. For example, the predictive order status application 104 may perform additional, fewer, or different operations than those operations as described in the present example. As another example, the steps of the process described herein may be performed by a computing system other than the predictive order status computing system 104, which may be, for example, one of the virtual objects executed on the virtual computing environment.

FIGS. 5A and 5B show example screenshots 500 and 502 of a user interface of the predictive order status application 126 displayed by the web browser 120 of the client computing device 102 according to an example embodiment. As shown in FIG. 5A, the portal includes a Monitor tab (currently shown), a Manage tab, an Order tab for ordering a new order, a Profile tab, and a Support tab. As shown in FIG. 5A, the current overall health status is Green. As shown in FIG. 5B, the current overall status of the ordered computing environment is shown in a status bar at "5%." In this example, the order was just placed by the central IT user. FIG. 5B shows an order summary including components of the ordered computing environment including a firewall, a standard development virtual machine, an Apache virtual machine, and other components. In addition, FIG. 5B shows an order progress log including information stored in the data source 106.

FIGS. 5C and 5D show an example current order status for an ordered computing environment. As shown in both FIG. 5C and FIG. 5D, the ordered computing environment is in the process of being built, provisioned, and deployed by the external providers and the internal providers. However, in each case, the ordered computing environment has an exception that requires central IT user attention. In one case, the ordered storage device is unavailable and in another case, the ordered networking device is unavailable. The central IT user may select an alternative configuration having a different device or wait for the construction of the ordered computing environment.

As shown in FIG. 5C, Task 1 represents 33% of the process, Task 2 represents 33% of the process, and Task 3 represents 34% of the process. Task 1 is completed and Task 2 is completed. Task 3 is not complete and has an exception. Task 3 has an exception=34% multiplied by zero=0%. The current overall status is estimated to be 66%. Taking into account exception status of each task, 66% is a simulated percentage value equal to a weight of each completed representative task plus a weight of each not completed representative task multiplied by amount of elapsed time since the order was placed divided by a total order process time.

In addition, as shown in FIG. 5D, the current overall status is a predicted or estimated current status. Task 1 and Task 2 represent 40% of the overall process. Tasks 1 and 2 are complete. Tasks 3-6 represent 60% of the overall process. Although tasks 3-6 are not yet complete, the current overall status is estimated to be approximately 62.5%.

Task 1=20%. Task 2=20%. Task 3=20% multiplied by 25/50=10%. Task 4=20% multiplied by 25/50=10%. Task 5=10% multiplied by 25/50 multiplied by 0.5=2.5%. Task 5 is not performed during the first half of the process and thus days in the first half of the process are weighted less than days in the second half of the process. Task 6 has an exception=10% multiplied by zero=0%. In other words, task 6 is paused. In certain instances, after the exception occurs the current overall status may pause at 62.5%. In other instances, after the exception occurs, the current overall status may not pause. The estimate of 62.5% is determined based on weight of each task and the status of each task (complete or not complete), the order date, the total order process time, and the exception status of each task. Taking into account exception status of each task, 62.5% is a simulated percentage value equal to a weight of each completed representative task plus a weight of each not completed representative task multiplied by amount of elapsed time since the order was placed divided by a total order process time.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
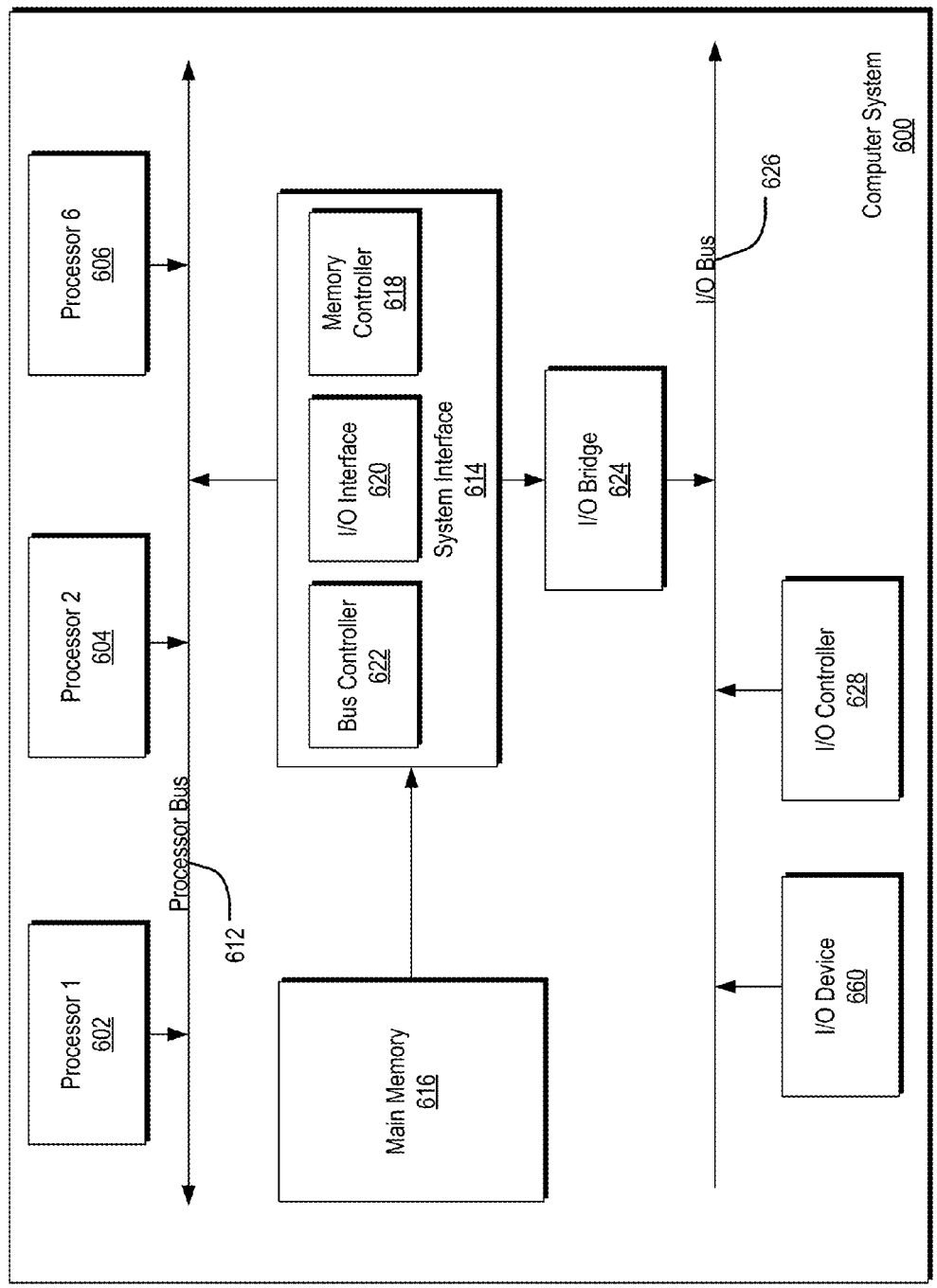
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system, comprising:
   at least one processor to:
   receive a request for a current order status of an order for a computing environment, the order having at least one task representing a segment of an order process for completing the order and the request associated with a unique order identifier;
   determine the current order status for the order for the computing environment, the current order status comprising a simulated percentage value that is based on an amount of elapsed time since the order was placed divided by a total order process time to complete the order;
   determine an exception status for the order for the computing environment, the exception status being one of on track to be completed within the total order process time to complete the order, possibly at risk for being completed within the total order process time to complete the order, and at risk for being completed within the total order process time; and
   send a graphical user interface representation of the current order status and the exception status.

2. The system of claim 1, the at least one processor further to determine the current order status for the order for the computing environment, each of the at least one task being one of a completed task and a not completed task, the simulated percentage value equal to a weight of each completed task of the at least one task plus a weight of each not completed task of the at least one task, the weight of each not completed task multiplied by the amount of elapsed time since the order was placed divided by the total order process time to complete the order.

3. The system of claim 1, the at least one processor further to determine that the exception status is at risk for being completed within the total order process time and pause the current order status.

4. The system of claim 1, the at least one processor further to:
   determine the current order status for the order for the computing environment based on a status of at least one sub-task of each of the at least one task, the at least one sub-task comprising a segment of a task process for completing a task and the status of each sub-task comprising one of completed and not completed.

5. The system of claim 1, the at least one processor further to automatically push the representation of the current order status and the exception status.

6. The system of claim 1, the at least one processor further to update the current order status and the exception status for the order for the computing environment at a particular interval of time.

7. The system of claim 1, the at least one processor further to:
  receive the order for the computing environment, the computing environment comprising a converged infrastructure;
  assign the order for the computing environment the unique order identifier;
  store the unique order identifier in a data source along with an order time;
  determine stock information for resources of the converged infrastructure from external providers and internal providers by sending at least one application programming interface (API) call to the external providers and the internal providers; and
  place the order for the computing environment in an order queue with the external providers and the internal providers.

8. The system of claim 1, the at least one processor further to determine the current order status for the order for the computing environment, each interval of time of the total order process time having a weighted value.

9. The system of claim 8, wherein an interval of time in a first half of the total order process time has a weighted value that is less than an interval of time in the second half of the total order process time.

10. A method, comprising:
  receiving, by at least one processor, a request for a current order status of an order for a computing environment, the order having at least one task representing a segment of an order process for completing the order and the request associated with a unique order identifier;
  determining, by the at least one processor, the current order status for the order for the computing environment, the current order status comprising a simulated percentage value that is based on an amount of elapsed time since the order was placed divided by a total order process time to complete the order;
  determining, by the at least one processor, an exception status for the order for the computing environment, the exception status being one of on track to be completed within the total order process time to complete the order, possibly at risk for being completed within the total order process time to complete the order, and at risk for being completed within the total order process time; and
  sending, by the at least one processor, a graphical user interface representation of the current order status and the exception status.

11. The method of claim 10, further comprising determining the current order status for the order for the computing environment, each of the at least one task being one of a completed task and a not completed task, the simulated percentage value equal to a weight of each completed task of the at least one task plus a weight of each not completed task of the at least one task, the weight of each not completed task multiplied by the amount of elapsed time since the order was placed divided by the total order process time to complete the order.

12. The method of claim 10, further comprising determining that the exception status is at risk for being completed within the total order process time and pausing the current order status.

13. The method of claim 10, further comprising determining the current order status for the order for the computing environment based on a status of at least one sub-task of each of the at least one task, the at least one sub-task comprising a segment of a task process for completing a task and the status of each sub-task comprising one of completed and not completed.

14. The method of claim 10, further comprising automatically pushing the representation of the current order status and the exception status.

15. The method of claim 10, further comprising updating the current order status and the exception status for the order for the computing environment at a particular interval of time.

16. The method of claim 10, further comprising:
  receiving the order for the computing environment, the computing environment comprising a converged infrastructure;
  assigning the order for the computing environment the unique order identifier;
  storing the unique order identifier in a data source along with an order time;
  determining stock information for resources of the converged infrastructure from external providers and internal providers by sending at least one application programming interface (API) call to the external providers and the internal providers; and
  placing the order for the computing environment in an order queue with the external providers and the internal providers.

17. The method of claim 10, further comprising determining the current order status for the order for the computing environment, each interval of time of the total order process time having a weighted value.

18. The method of claim 17, further comprising determining the current order status for the order for the computing environment, wherein an interval of time in a first half of the total order process time has a weighted value that is less than an interval of time in the second half of the total order process time.

19. A non-transitory computer-readable medium having instructions stored thereon that, when executed by at least one processor, cause the at least one processor to perform operations comprising:
  receiving a request for a current order status of an order for a computing environment, the order having at least one task representing a segment of an order process for completing the order and the request associated with a unique order identifier;
  determining the current order status for the order for the computing environment, the current order status comprising a simulated percentage value that is based on an amount of elapsed time since the order was placed divided by a total order process time to complete the order;
  determining an exception status for the order for the computing environment, the exception status being one of on track to be completed within the total order process time to complete the order, possibly at risk for being completed within the total order process time to complete the order, and at risk for being completed within the total order process time; and sending a graphical user interface representation of the current order status and the exception status.

20. The non-transitory computer-readable medium of claim 19, the operations further comprising determining the current order status for the order for the computing environment, each of the at least one task being one of a completed task and a not completed task, the simulated percentage value equal to a weight of each completed task of the at least one task plus a weight of each not completed task of the at least one task, the weight of each not completed task multiplied by the amount of elapsed time since the order was placed divided by the total order process time to complete the order.

* * * * *